United States Patent [19]

Lorraine

[11] Patent Number: 5,320,078
[45] Date of Patent: Jun. 14, 1994

[54] REMOTE MOUNTING OF A FUEL PRESSURE REGULATOR FOR AN ENGINE

[75] Inventor: Jack R. Lorraine, Newport News, Va.

[73] Assignee: Siemens Automotive L.P., Auburn Hills, Mich.

[21] Appl. No.: 850,175

[22] Filed: Mar. 11, 1992

[51] Int. Cl.[5] ............... F02M 55/02; F16L 33/00
[52] U.S. Cl. ........................... 123/468; 123/456; 285/243
[58] Field of Search ............. 123/468, 469, 470, 472, 123/456, 447; 285/243, 320

[56] References Cited

U.S. PATENT DOCUMENTS

| 2,952,482 | 9/1960 | Torres | 285/320 |
|---|---|---|---|
| 3,574,355 | 4/1971 | Oetiker | 285/243 |
| 3,858,915 | 1/1975 | De Vincent | 285/320 |
| 4,152,016 | 5/1979 | Weinhold | 285/243 |
| 4,203,402 | 5/1980 | Freyn | 123/470 |
| 4,212,487 | 7/1980 | Jones | 285/243 |
| 4,284,039 | 8/1981 | Bellicardi | 123/463 |
| 4,586,477 | 5/1986 | Field | 123/468 |
| 4,991,556 | 2/1991 | Mahnke | 123/463 |
| 5,074,600 | 12/1991 | Weinhold | 285/243 |
| 5,094,211 | 3/1992 | Mahnke | 123/456 |
| 5,105,787 | 4/1992 | Imoehl | 123/456 |
| 5,152,269 | 10/1992 | Murphy | 123/463 |
| 5,168,856 | 12/1992 | Lorraine | 123/456 |
| 5,172,671 | 12/1992 | Peters | 123/456 |

FOREIGN PATENT DOCUMENTS 227889 8/1960 France ................... 285/243

Primary Examiner—Carl S. Miller
Attorney, Agent, or Firm—George L. Boller; Russel C. Wells

[57] ABSTRACT

The fuel pressure regulator is disposed in an off-engine mounting that is fastened to a wall of the engine compartment. The mounting is a body of synthetic material having a socket within which the fuel pressure regulator is disposed. Nipples for fluid-connecting flexible fuel conduits to the body are integral formations of the body. Protective walls that are also integral formations of the body circumferentially surround the nipples. Levers are pivotally connected with the protective walls, and when operated to force-applying positions, they pinch the sides of the conduits against the nipples.

28 Claims, 1 Drawing Sheet

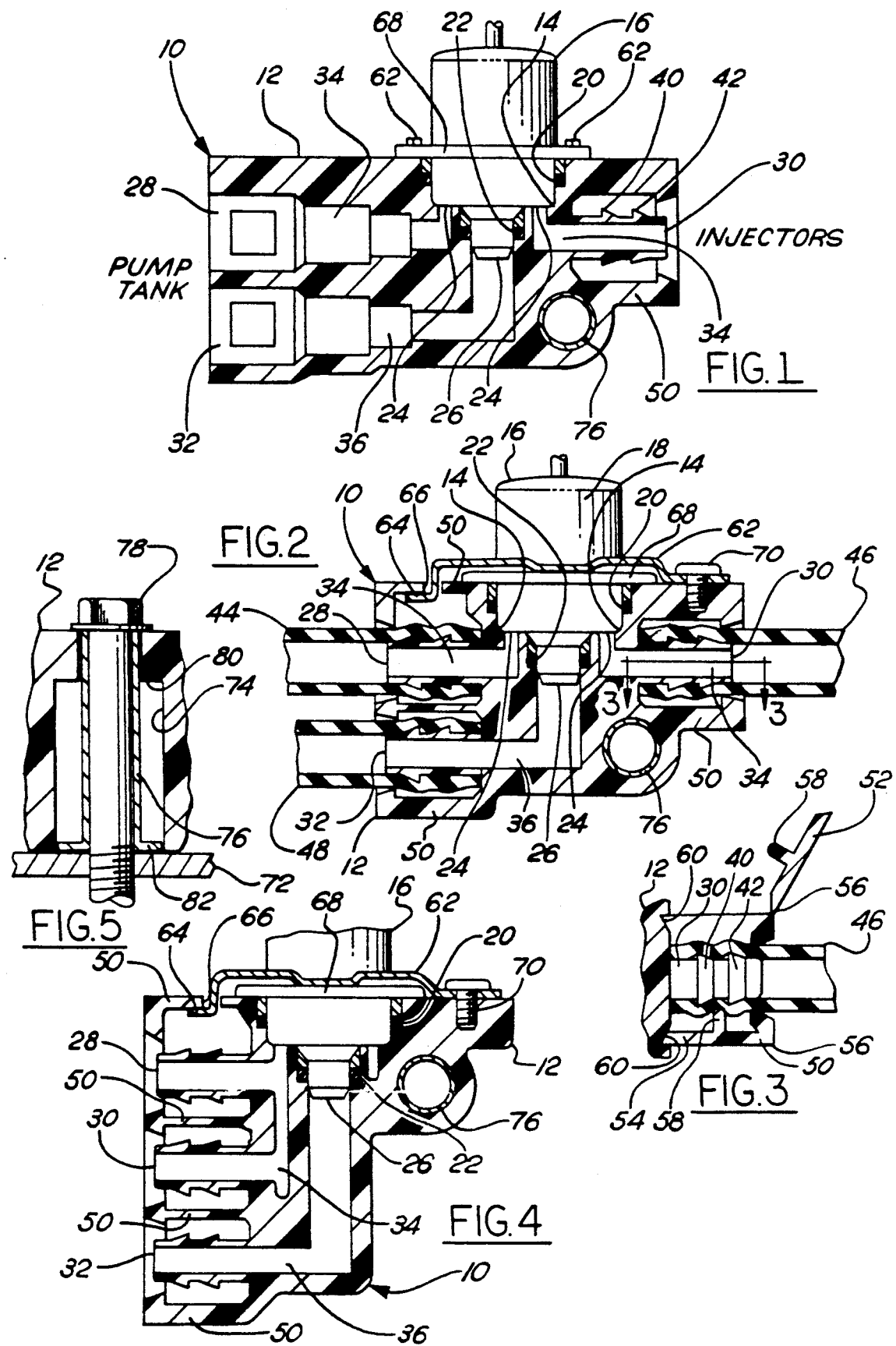

REMOTE MOUNTING OF A FUEL PRESSURE REGULATOR FOR AN ENGINE

FIELD OF THE INVENTION

This invention relates to fuel injection systems for gasoline- or flex-fuel-powered internal combustion engines.

BACKGROUND AND SUMMARY OF THE INVENTION

A typical fuel injection system for a spark-ignited internal combustion engine that powers an automotive vehicle comprises a fuel pressure regulator that regulates the pressure of fuel that is supplied to the fuel injectors. A common practice is to mount the fuel pressure regulator in the fuel rail.

Remote mounting of the fuel pressure regulator, separate from the fuel rail, may be desirable, and it is toward this objective that the present invention is directed. Remote mounting may be desirable for different reasons, such as space constraints within the engine compartment for example.

According to principles of the invention, the fuel pressure regulator is mounted in the engine compartment, but not on the engine. Such an off-engine mounting comprises a body having a receptacle, a fuel pressure regulator disposed in, and sealed in fluid-tight manner to, the receptacle, three fuel ports, first internal passageway structure that is common to a first one of the three fuel ports, to a second one of the three fuel ports, and to the fuel inlet of the fuel pressure regulator, and second internal passageway structure that is common to a third of the three fuel ports and to the return port of the fuel pressure regulator. When the body is installed in a fuel injection system in an automotive vehicle, a first conduit communicates the first fuel port to a pump that delivers pressurized fuel that is to be pressure-regulated by the fuel pressure regulator, a second conduit communicates the second fuel port to the fuel injectors, and a third conduit communicates the third fuel port to the fuel tank.

The body is a synthetic material comprising a through-hole that intersects neither the receptacle nor the two passageway structures, and a tubular metal insert, or bushing, is disposed in this through-hole. A screw is used to fasten the body to the engine compartment. The screw's shank passes through the insert to engage the engine compartment, and the screw is tightened. The insert is rotatable within the through-hole prior to final tightening of the screw so that the tightening of the screw does not tend to twist the body out of a desired orientation on the engine compartment.

At least one of the three fuel ports is a nipple that is an integral formation of the body. The associated conduit is a flexible hose having an end that telescopes over the nipple. Each of two levers is pivotally mounted integrally on the body proximate the nipple by a living hinge connection with the body so as to be selectively operable from a non-force-applying position which applies no force on the flexible hose end to a force-applying position which applies force. The two levers are diametrically opposite each other about the nipple.

Each lever comprises a free end spaced from its living hinge connection with the body, and the body comprises, for each lever, a corresponding integral catch. Each living hinge connection is disposed proximate the distal end of the nipple, and the catches are disposed proximate the proximal end of the nipple. The free end of each lever is caught by the corresponding catch when it is in its force-applying position. Each lever includes between its living hinge connection to the body and its free end, a projection that extends laterally away from the lever, and that forcefully bears against the flexible hose end when in its force-applying position so as to pinch the flexible hose end against the nipple. The nipple comprises two axially spaced apart circumferentially extending barbs and the projections bear against the flexible hose end at a location between the two barbs.

The body further comprises a protective wall circumferentially bounding the nipple in outwardly spaced relation to the nipple, and the levers form a portion of the protective wall when in their force-applying positions.

A bracket keeps the fuel pressure regulator in the receptacle. It has a tab that passes through an aperture in the protective wall and has an interference with the protective wall for positioning the bracket to keep the fuel pressure regulator in the receptacle.

Features that are believed to constitute patentable subject matter are defined in the claims. Drawings accompany the disclosure and present a presently preferred embodiment of the invention according to the best mode contemplated at this time for carrying out the invention.

BRIEF DESCRIPTION OF THE DRAWINGS

FIG. 1 is a front elevation partly in cross section through a first embodiment of fuel pressure regulator mounting according to the invention.

FIG. 2 is a front elevation partly in cross section through a second embodiment of fuel pressure regulator mounting according to the invention.

FIG. 3 is a fragmentary cross section in the direction of arrows 3—3 in FIG. 2.

FIG. 4 is a front elevation partly in cross section through a third embodiment of fuel pressure regulator mounting according to the invention.

FIG. 5 is a fragmentary cross section illustrating a representative attachment of the mounting to a portion of an engine compartment of an automotive vehicle.

DESCRIPTION OF THE PREFERRED EMBODIMENT

FIGS. 1, 2, and 4 illustrate three embodiments of a remote mounting 10 for a fuel pressure regulator of a fuel injection system of a gasoline- or flex-fuel-powered internal combustion engine that powers an automotive vehicle. Each embodiment has a body 12 comprising a receptacle 14 for a fuel pressure regulator 16. Fuel pressure regulator 16 is a conventional device, such as those described in commonly assigned U.S. Pat. Nos. 4,928,729 and 5,076,320. Fuel pressure regulator 16 has a housing 18 that is sealed exteriorly in fluid-tight manner to the wall surface of receptacle 14 by sealing means 20, 22. Housing 18 has a fuel inlet 24 and a fuel return, or outlet, 26.

Body 12 comprises three fuel ports 28, 30, and 32 on its exterior to provide for the connection of respective fuel conduits. Body 12 also has a first internal passageway structure 34 that is common to port 28, to port 30, and to fuel inlet 24; it also has a second internal passageway structure 36 that is common to port 32 and to fuel return 26. In each embodiment, at least one of the three ports 28, 30, and 32 is a nipple that is an integral formation of body 12, and associated with the nipple are additional structural features that will be subsequently described in detail, but for the moment may be said to be useful in assuring the integrity of the joint that is formed when the associated conduit is telescoped onto the nipple. The embodiment of FIG. 1 has one such nipple while those of FIGS. 2 and 4 have three such nipples. Ports 28 and 32 of FIG. 1 are adapted to receive "quick-connect" type fittings.

When each embodiment is installed in an operative fuel injection system, port 28 is in communication with a pump that delivers pressurized fuel from a fuel tank to it, port 30 is in communication with an engine-mounted fuel rail that contains electromechanically actuated fuel injectors, and port 32 is in communication with the fuel tank. In this way pressurized fuel from the tank is delivered to the fuel rail to serve the fuel injectors while the fuel pressure is regulated by fuel pressure regulator 16. In performing its function, fuel pressure regulator 16 returns excess fuel from fuel return 26, and through passageway structure 36 and port 32, back to the fuel tank.

The nipple forming port 30 in FIG. 1 is representative of the nipples in the other embodiments; it is of circular tubular shape, having a proximal end proximate body 12 and a distal end opposite its proximal end. The nipple is configured for reception of an end portion of a flexible conduit that is impervious to fuel and that can handle the fuel pressure, nylon tubing for example. The nipple has two axially spaced apart, circumferentially extending hose barbs 40 and 42 intermediate its proximal and distal ends. They are configured preferably so that the end of a conduit can be pushed onto the nipple and over the barbs by hand with relatively modest force, 15–30 pounds for example. FIG. 2 shows three such conduits 44, 46, and 48 installed in this way over respective nipples constituting ports 28, 30, and 32.

Also associated with each nipple is a protective wall 50 that circumferentially bounds the nipple in outwardly spaced relationship thereto. The wall is an integral formation of body 12 and extends slightly beyond the distal end of the nipple. It is spaced sufficiently from the nipple so as not to impede the telescoping of the conduit over the nipple.

A further associated feature is a means, additional to barbs 40 and 42, for resisting separation of an installed conduit from the nipple. This feature is embodied, as shown by FIG. 3, in a pair of levers 52 and 54 that are disposed diametrically opposite each other about the nipple. Each lever is pivoted on body 12 by a living hinge 56 that integrally joins the lever with wall 50 proximate the distal end of the nipple. Each lever is operable from a non-force-applying position to a force-applying position. FIG. 3 shows lever 52 in non-force-applying position prior to being rotated about its hinge 56 into a gap 57 for it in wall 50, and lever 54 in force-applying position after having been rotated about its hinge 56 into a gap for it in wall 50. When the conduit end is being pushed onto the nipple, the levers are not in the force-applying position. After the conduit end has been pushed onto the nipple, the levers are operated to force-applying positions.

Each lever has a distal end opposite hinge 56. Intermediate its distal end and hinge 56, each lever has a projection 58. When each lever is pivoted from non-force-applying position to force-applying position, the tip of projection is forced against the side of the conduit, pinching the conduit against the side of the nipple. Each projection is disposed to act against that portion of the conduit that is between the two hose barbs 40 and 42. As the projection arrives at its full force-applying position, the distal end of each lever is caught by a corresponding catch 60 that is an integral formation of body 12 proximate the proximal end of the nipple. The catching of the lever by the catch serves to keep the lever in force-applying position, and when in force-applying position, each lever forms a portion of the wall protecting the joint.

In order to keep fuel pressure regulator 16 in receptacle 14, a bracket 62, like that described in commonly assigned U.S. Pat. No. 4,991,556, is used. Bracket 62 has a bent tab 64 that passes through a suitably shaped slot 66 in the adjacent wall 50 and that is associated with the slot and wall in analogous manner to that described in the just-mentioned patents. When the bracket is retaining the fuel pressure regulator, tab 64 has an interference with wall 50 adjacent slot 66 to prevent the tab from coming out of the slot, portions of the bracket are caused to bear against a flange 68 of the fuel pressure regulator housing, urging the flange against body 12, and a screw 70 passes through a hole in the end of the bracket opposite tab 64 and is tightened into body 12.

Remote mounting 10 is mounted in the engine compartment of the automotive vehicle at a location that is off the engine, for example on a sheet metal wall 72 as shown in FIG. 5. Body 12 has a through-hole 74 that intersects neither receptacle 14 nor passageway structures 34, 36. A tubular metal insert, or bushing, 76 is disposed in through-hole 74 and a headed screw 78 has a shank passing through the insert to thread into a hole in the engine compartment wall. The screw is tightened to mount said body in said engine compartment, but the insert is rotatable within the through-hole prior to final tightening so that the act of tightening the screw does not tend to twist body 12 from its desired orientation. If desired, locator means could be provided between the body and the engine compartment wall to aid in preventing such undesired twisting of body 12 during tightening of screw 78. Through-hole 74 has an internal shoulder 80, and screw 78 is pre-assembled into the insert with a press-fit so that the head of the screw and a flange 82 at the end of the insert serve to retain the screw and bushing in the through-hole prior to fastening the mounting to the engine compartment wall. The shoulder is disposed at a location along the length of through-hole 74 that allows the screw and insert to retract sufficiently into the trough-hole to allow the rear face of body 12 to be disposed directly against, or at least very close to, the engine compartment wall at time of installation. When the screw is tightened to the appropriate torque, the insert is placed in compression so that the screw remains in tension, and in this way the attachment is secured against loosening even though the body is of a material that may be subject to plastic deformation when compressed.

Body 12 is constructed from a suitable synthetic material, such as a fuel-compatible nylon having a suitable glass-fill, by injection molding techniques in a suitably designed mold. The mold is constructed with slides that operate along different lines of draw to create the integral formation of the protective walls, levers, and nipples. The end of each nipple that is distal to the crest of its barb 42 is defined by an uninterrupted surface so that the tapered face of each barb 42 will present a good sealing surface to the inside wall of the corresponding conduit that is telescoped over it. The differences in the configurations that have been disclosed are primarily to accommodate the requirements of particular engine compartment installations. Typical installation practices will mount the remote mounting, including the installed pressure regulator, on the engine compartment wall before the conduits are connected to body 12.

While a presently preferred embodiment of the invention has been illustrated and described, it should be appreciated that principles are applicable to other embodiments.

What is claimed is:

1. An automotive vehicle that comprises an engine compartment containing an internal combustion engine for powering the vehicle, that comprises a tank containing liquid fuel for said engine, that comprises engine-mounted fuel injector valve means, and that comprises pump means for pumping fuel from said tank to said fuel injector valve means, characterized by an off-engine mounting for a fuel pressure regulator that regulates the pressure of pumped fuel delivered to said fuel injector valve means, said off-engine mounting comprising a body having an exterior surface, said body comprising a receptacle extending into said body from said exterior surface, said receptacle having a surface, a fuel pressure regulator disposed in said receptacle, said fuel pressure regulator comprising a housing, sealing means sealing said housing to said receptacle surface in a fluid-tight manner, said housing comprising a fuel inlet via which pressurized liquid fuel enters said fuel pressure regulator and a fuel return via which excess fuel exits said fuel pressure regulator, said body comprising three fuel ports at its exterior surface, said body comprising first internal passageway structure that is common to a first one of said three fuel ports, to a second one of said three fuel ports, and to said fuel inlet, and second internal passageway structure that is common to a third of said three fuel ports and to said return port, a fish conduit communicating said first fuel port to said pump means, a second conduit communicating said second fuel port to said fuel injector valve means, a third conduit communicating said third fuel port to said tank, and means mounting said body in said engine compartment at a location other than on said engine, in which said body is a synthetic material, one of said three fuel ports is a nipple that is an integral formation of said body, the particular one of said conduits that is associated with said one of said three fuel ports comprises a flexible hose having an end that telescopically engages said nipple, and means, that is also an integral formation of said body but additional to said nipple, exerting a force on said flexible hose that resists telescopic disengagement of said flexible hose end from said nipple.

2. For an internal combustion engine that comprises engine-mounted fuel injector valve means, pump means for pumping liquid fuel from a fuel tank to the fuel injector valve means, a fuel pressure regulator that regulates the pressure of pumped fuel delivered to the fuel injector valve means and returns excess fuel to the fuel tank, an off-engine mounting for said fuel pressure regulator, said mounting comprising a body having an exterior surface, said body comprising a receptacle extending into said body from said exterior surface, said receptacle having a surface, a fuel pressure regulator disposed in said receptacle, said fuel pressure regulator comprising a housing, sealing means sealing said housing to said receptacle surface in a fluid-tight manner, said housing comprising a fuel inlet via which pumped liquid fuel enters said fuel pressure regulator and a fuel return via which excess fuel exits said fuel pressure regulator for return to the tank, said body comprising three fuel ports at its exterior surface, said body comprising first internal passageway structure that is common to a first one of said three fuel ports, to a second one of said three fuel ports, and to said fuel inlet, and second internal passageway structure that is common to a third of said three fuel ports and to said return port, in which said body is a synthetic material, one of said three fuel ports is a nipple that is an integral formation of said body and is adapted to telescopically receive an end of a flexible hose, and means, that is also an integral formation of said body but additional to said nipple, for exerting a force on such a flexible hose to resist telescopic disengagement of such a flexible hose end from said nipple.

3. For an internal combustion engine that comprises engine-mounted fuel injector valve means, pump means for pumping liquid fuel from a fuel tank to the fuel injector valve means, a fuel pressure regulator that regulates the pressure of pumped fuel delivered to the fuel injector valve means, an off-engine mounting for said fuel pressure regulator, said mounting comprising a body having an exterior surface, said body comprising a receptacle extending into said body from said exterior surface, said receptacle having a surface, a fuel pressure regulator disposed in said receptacle, said fuel pressure regulator comprising a housing, sealing means sealing said housing to said receptacle surface in a fluid-tight manner, said housing comprising a fuel inlet via which pumped liquid fuel enters said fuel pressure regulator and a fuel outlet via which fuel exits said fuel pressure regulator, said body comprising multiple fuel ports at its exterior surface, said body comprising first internal passageway structure that is common to one of said fuel ports and to said fuel inlet, and second internal passageway structure that is common to another of said fuel ports and to said outlet port, one of said first and second ports comprising a nipple, said body comprising a protective wall for said nipple in outwardly spaced relation to said nipple, an aperture in said protective wall, and a bracket for keeping said fuel pressure regulator in said receptacle, said bracket having a tab that passes through said aperture and has an interference with said protective wall for positioning said bracket to keep said fuel pressure regulator in said receptacle.

4. An off-engine mounting as set forth in claim 3 in which said body is a synthetic material and said nipple and said protective wall are integral formations of said body.

5. An internal combustion engine fuel injection system comprising a joint at which a flexible hose constituting one part of the system connects to a nipple that extends from a body of another part of the system by telescoping over said nipple, said joint comprising means, on said body additional to said nipple, for exerting a force on said flexible hose to resist telescopic disengagement of said flexible hose end from said nipple, said means, on said body additional to said nipple, for exerting a force on such a flexible hose that resists telescopic disengagement of such a flexible hose end from said nipple comprises a lever that is pivotally mounted on said body by a hinge connection with said body so as to be selectively operable from a non-force-applying position which applies no force on said flexible hose to a force-applying position which applies force on said flexible hose.

6. A system as set forth in claim 5 in which said lever comprises a free end spaced from said hinge connection, said body comprises a catch, and said free end of said lever is caught by said catch when said lever is in said force-applying position.

7. A system as set forth in claim 6 in which said hinge connection comprises a living hinge integrally joining said lever with said body, and in which said catch is an integral formation of said body.

8. An off-engine mounting as set forth in claim 7 including a protective wall circumferentially bounding said nipple in outwardly spaced relation to said nipple, and in which said lever forms a portion of said protective wall when in said force-applying position.

9. An automotive vehicle as set forth in claim 1 in which said body is a synthetic material comprising a through-hole that intersects neither said receptacle nor said passageway structures, and said means mounting said body in said engine compartment comprises a tubular metal insert disposed in said through-hole and fastener means that has a shank passing through said insert to engage said engine compartment and that is tightened to mount said body in said engine compartment, said insert being rotatable within said through-hole prior to final tightening of said fastener means.

10. An automotive vehicle as set forth in claim 1 in which said means, that is also an integral formation of said body but additional to said nipple, exerting a force on said flexible hose that resists telescopic disengagement of said flexible hose end from said nipple comprises a lever that is pivotally mounted on said body by a hinge connection with said body so as to be selectively operable from a non-force-applying position which applies no force on said flexible hose to a force-applying position which applies force on said flexible hose.

11. An automotive vehicle as set forth in claim 10 in which said lever comprises a free end spaced from said hinge connection, said body comprises a catch, and said free end of said lever is caught by said catch when said lever is in said force-applying position.

12. An automotive vehicle as set forth in claim 11 in which said hinge connection comprises a living hinge integrally joining said lever with said body, and in which said catch is an integral formation of said body.

13. An automotive vehicle as set forth in claim 12 in which said nipple has a proximal end adjacent said body and a distal end spaced from said proximal end, said hose telescopically fits over said distal end, said lever includes a projection that extends laterally away from the lever intermediate said living hinge connection and said free end, and said projection forcefully bears against said flexible hose end when in force-applying position so as to pinch said flexible hose end against said nipple.

14. An automotive vehicle as set forth in claim 13 in which said nipple comprises two axially spaced apart circumferentially extending barbs and said projection bears against said flexible hose end at a location between said two barbs.

15. An automotive vehicle as set forth in claim 12 in which said nipple has a proximal end adjacent said body and a distal end spaced from said proximal end, said hose telescopically fits over said distal end, said living hinge connection is disposed proximate said distal end, and said catch is disposed proximate said proximal end.

16. An automotive vehicle as set forth in claim 10 including a protective wall circumferentially bounding said nipple in outwardly spaced relation to said nipple, and in which said lever forms a portion of said protective wall when in said force-applying position.

17. An automotive vehicle as set forth in claim 10 including diametrically opposite said lever about said nipple, a second lever that is pivotally mounted on said body by a hinge connection with said body so as to be selectively operable from a non-force-applying position which applies no force on said flexible hose to a force-applying position which applies force on said flexible hose.

18. An automotive vehicle as set forth in claim 1 in which said body comprises a protective wall for said nipple in outwardly spaced relation to said nipple, an aperture in said protective wall, and a bracket for keeping said fuel pressure regulator in said receptacle, said bracket having a tab that passes through said aperture and has an interference with said protective wall for positioning said bracket to keep said fuel pressure regulator in said receptacle.

19. An off-engine mounting as set forth in claim 2 in which said body is a synthetic material comprising a through-hole that intersects neither said receptacle nor said passageway structures, and means for mounting said body on an off-engine location comprising a tubular metal insert disposed in said through-hole and fastener means that has a shank passing through said insert for engaging an off-engine location and that is tightenable to mount said body on an off-engine location, said insert being rotatable within said through-hole prior to final tightening of said fastener means.

20. An off-engine mounting as set forth in claim 2 in which said means, that is also an integral formation of said body but additional to said nipple, for exerting a force on such a flexible hose that resists telescopic disengagement of such a flexible hose end from said nipple comprises a lever that is pivotally mounted on said body by a hinge connection with said body so as to be selectively operable from a non-force-applying position which applies no force on such a flexible hose to a force-applying position which applies force on such a flexible hose.

21. An off-engine mounting as set forth in claim 20 in which said lever comprises a free end spaced from said hinge connection, said body comprises a catch, and said free end of said lever is caught by said catch when said lever is in said force-applying position.

22. An off-engine mounting as set forth in claim 21 in which said hinge connection comprises a living hinge integrally joining said lever with said body, and in which said catch is an integral formation of said body.

23. An off-engine mounting as set forth in claim 22 in which said nipple has a proximal end adjacent said body and a distal end spaced from said proximal end, such a hose telescopically fits over said distal end, said lever includes a projection that extends laterally away from the lever intermediate said living hinge connection and said free end, and said projection is adapted to forcefully bear against such a flexible hose end when in force-applying position so as to pinch such a flexible hose end against said nipple.

24. An off-engine mounting as set forth in claim 23 in which said nipple comprises two axially spaced apart circumferentially extending barbs and said projection is adapted to bear against such a flexible hose end at a location between said two barbs.

25. An off-engine mounting as set forth in claim 22 in which said nipple has a proximal end adjacent said body and a distal end spaced from said proximal end, such a hose telescopically fits over said distal end, said living hinge connection is disposed proximate said distal end, and said catch is disposed proximate said proximal end.

26. An off-engine mounting as set forth in claim 20 including a protective wall circumferentially bounding said nipple in outwardly spaced relation to said nipple, and in which said lever forms a portion of said protective wall when in said force-applying position.

27. An off-engine mounting as set forth in claim 20 including diametrically opposite said lever about said nipple, a second lever that is pivotally mounted on said body by a hinge connection with said body so as to be selectively operable from a non-force-applying position which applies no force on such a flexible hose to a force-applying position which applies force on such a flexible hose.

28. An off-engine mounting as set forth in claim 2 in which said body comprises a protective wall for said nipple in outwardly spaced relation to said nipple, an aperture in said protective wall, and a bracket for keeping said fuel pressure regulator in said receptacle, said bracket having a tab that passes through said aperture and has an interference with said protective wall for positioning said bracket to keep said fuel pressure regulator in said receptacle.

* * * * *